United States Patent [19]

Jouade

[11] Patent Number: 4,840,357
[45] Date of Patent: Jun. 20, 1989

[54] HYDRAULIC ANTIVIBRATORY SUPPORT SLEEVES

[75] Inventor: Pierre Jouade, Chateaudun, France

[73] Assignee: Hutchinson, France

[21] Appl. No.: 207,517

[22] Filed: Jun. 16, 1988

[30] Foreign Application Priority Data

Jun. 19, 1987 [FR] France ................................ 87 08615

[51] Int. Cl.$^4$ ............................................. F16F 5/00
[52] U.S. Cl. ................................... 267/140.1; 267/219
[58] Field of Search .................... 123/192 R; 248/562; 267/153, 219, 140.1

[56] References Cited

U.S. PATENT DOCUMENTS 4,630,806 12/1986 Dan et al. ...................... 267/140.1
4,768,760 9/1988 Le Fol .............................. 267/219 X

Primary Examiner—Duane A. Reger
Attorney, Agent, or Firm—Larson and Taylor

[57] ABSTRACT

A hydraulic antivibratory support sleeve is provided comprising two rigid tubular frames (1,2) one surrounding the other and joined together by an elastomer body (3) adhered thereto and shaped so as to form therewith at least two diametrically opposite sealed pockets (A,B) communicating together through a narrow channel (E), the assembly formed by said pockets and said channel being filled with a damping liquid (L), the pockets being in the form of cavities formed axially in at least one solid annulus. These cavities (A,B) open respectively into two separate annular chambers (C,D) and these two chambers are joined together exclusively by the narrow channel (E) which extends axially or helically.

5 Claims, 1 Drawing Sheet

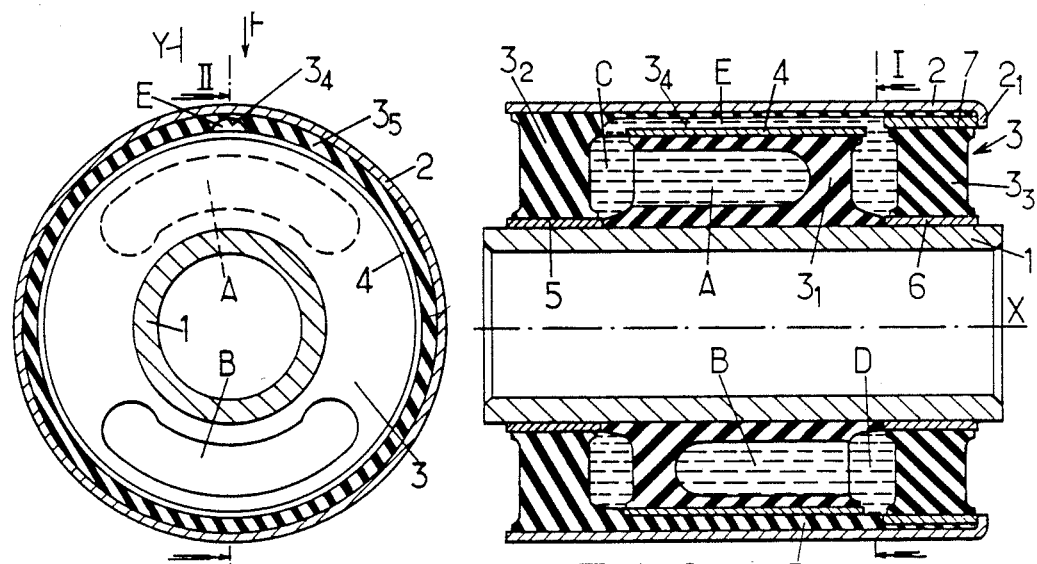
FIG.1.
FIG.2.
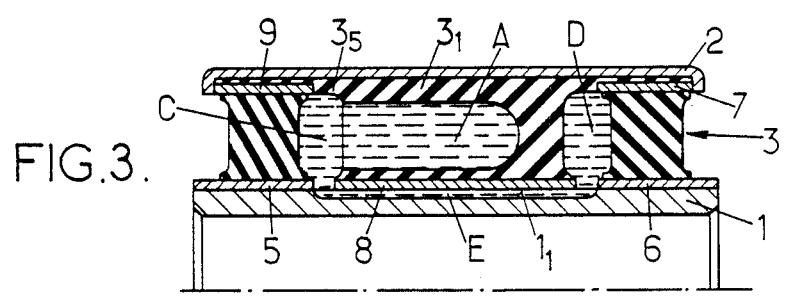
FIG.3.
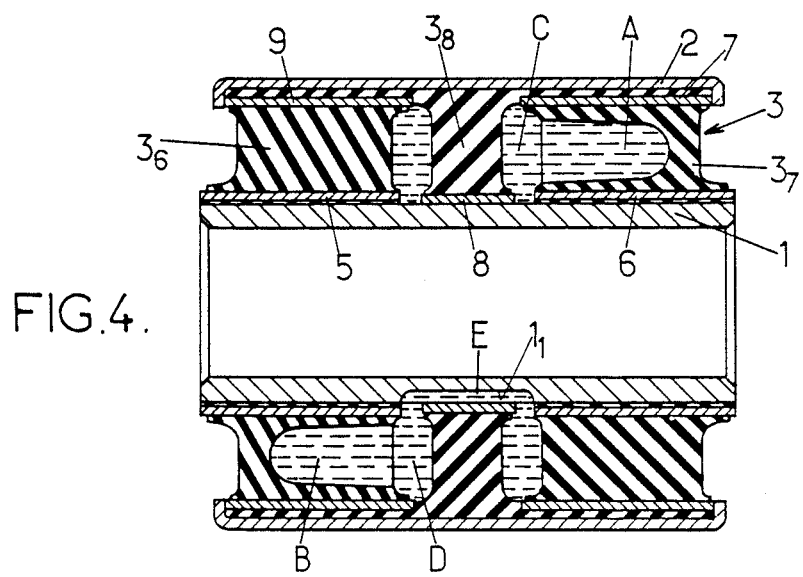
FIG.4.

HYDRAULIC ANTIVIBRATORY SUPPORT SLEEVES

The invention relates to hydraulic antivibratory support sleeves comprising two rigid tubular frames, one surrounding the other, preferably of revolution at least partially, and coaxial and concentric at least under load, which frames are joined together by an elastomer body adhered thereto and shaped so as to form therewith at least two sealed pockets diametrically opposite in a direction Y and communicating with each other through a narrow channel, the assembly formed by said pockets and said channel being filled with a damping liquid.

Such coupling sleeves are intended for mounting between two rigid parts which may be made fast respectively with the two frames and which are likely to be subjected, with respect to each other, to oscillations oriented in direction Y, the assembly being adapted so that, for some at least of these oscillations, the liquid is driven alternately from one of the pockets to the other and conversely through the narrow channel, which creates in this liquid, for certain oscillation frequencies, a resonance phenomenon capable of damping the transmission of these oscillations from one of the frames to the other.

Coupling sleeves of the kind in question are for example intended to be inserted between a vehicle chassis and the internal combustion engine or the front or rear undercarriage of this vehicle.

The invention relates more particularly, among the above support sleeves, to those in which the pockets are in the form of cavities formed axially in at least one solid annulus forming the elastomer body, which cavities have a relatively small radial thickness so as to be substantially closed by radial crushing.

In known embodiments of such coupling sleeves, the cavities open axially into the same end face of the annulus and the narrow channel which joins them together extends along an arc of a circle having as axis the axis X of the sleeve and is generally defined by said face and a washer applied axially against this face, one at least of the two bearing surfaces thus applied one against the other being recessed by a circular or semi-circular groove forming such channel.

Such constructions have certain drawbacks and, in particular, the following:
—if the washer is made from elastomer, the pressure which drives the damping liquid from one of the pockets to the other through the narrow channel may deform this washer, which may destroy the sealing of the wall defining this channel or at least modify the dimensional characteristics of said channel, to which characteristics the value of the working frequency of the damping support is related,
—if the washer is rigid, more particularly if made of metal, the maximum amount of deformation likely to be undergone by the support is limited.

The purpose of the present invention is in particular to overcome these drawbacks.

For this, the damping supports of the invention are essentially characterized in that their pockets open respectively into two separate annular or semi-annular chambers formed in the elastomer body and in that these two chambers are joined together exclusively by the above mentioned narrow channel, said channel being here oriented axially or at least in a direction having an axial component.

In advantageous embodiments, recourse is further had to one and/or other of the following arrangements:
—the two pockets are formed axially in two opposite directions in the same central annulus and each of the two annular or semi-annular chambers into which these two pockets open respectively is defined axially by said central annulus and an end annulus,
—the two pockets are formed axially in two opposite directions in two separate annuli and the two annular or semi-annular chambers into which these two pockets open respectively are separated axially from each other by a third central annulus,
—the narrow channel extends along the external tubular frame,
—the narrow channel extends along the internal tubular frame.

Apart from these main arrangements, the invention comprises other arrangements which are preferably used at the same time and which will be discussed more explicitly hereafter. A few preferred embodiments of the invention will now be described with reference to the accompanying drawings in a way which is of course in no wise limitative.

FIGS. 1 and 2 of these drawings show respectively, in cross section through I—I of FIG. 2 and in axial section through II—II of FIG. 1 a support sleeve formed in accordance with the invention.

FIG. 3 shows a variant of such a coupling sleeve in a semi-axial section.

FIG. 4 shows another variant of such a sleeve in axial section.

In a way known per se, the coupling sleeve comprises in each case:
—an internal tubular metal frame of revolution 1 with axis X,
—an external tubular metal frame of revolution 2 coaxial with frame 1 at least in the fitted and loaded condition of the sleeve and surrounding this frame 1,
—and an elastomer body 3 connecting the two frames 1 and 2 together while forming therebetween two sealed pockets A,B diametrically opposite in a direction Y.

The internal frame 1 is intended to be secured to a shaft (not shown) which passes jointingly therethrough while the external frame 2 is intended to be secured to a bearing (not shown), the shaft and the bearing being fast respectively with two rigid elements between which it is desired to provide an anit-vibratory support, elements such as a vehicle suspension arm or engine and the chassis of this vehicle.

The two pockets A and B communicate with each other through a narrow channel E which will be discussed further on.

These two pockets and the narrow channel are filled with a liquid L.

In a way also known per se, the two pockets A and B are formed by recesses provided axially in at least one solid annulus forming the elastomer body 3.

But here, these pockets open axially into two separate annular or semi-annular chambers C and D with axis X and having a relatively large axial section, and it is these two chambers which are joined together by the narrow channel E.

In the embodiment illustrated in FIGS. 1 and 2, the two pockets A and B are formed in a single central annulus designated by the reference $3_1$.

The axial directions in which the two pockets are formed are in this case opposite and the two chambers C and D border annulus $3_1$ axially along its two end faces respectively, these two chambers being completed by two end elastomer annuli $3_2$ and $3_3$ which are inserted jointingly, like annulus $3_1$, between the two tubular frames 1 and 2, but at their two axial ends.

The narrow channel E extends here axially.

It is defined:

—externally by a groove $3_4$ formed in a cylindrical elastomer jacket $3_5$ integrally molded with annulus $3_2$ and lining the external tubular frame 2 on the inside, —and inwardly by a cylindrical socket 4 whose external and internal faces are applied intimately against jacket $3_5$ and annulus $3_1$ respectively.

The narrow channel E which connects the two chambers C and D together could also have a shape other than rectilinear and axial, for example helical or similar, whilst still being defined by socket 4 and jacket $3_5$.

It can be further seen in FIG. 2:

—that annulus $3_2$ is adhered inwardly against a cylindrical ring 5,

—and that two other cylindrical rings 6 and 7 are provided for defining annulus $3_3$ inwardly and outwardly.

As will be readily understood, the different annuli, rings and socket defined above are fitted in a suitable order about the internal tubular frame 1 and the assembly is then held in position by crimping one end of the external tubular frame 2 bent back inwardly at $2_1$ over ring 7 and by at least one spot weld suitably situated between one at least of rings 5 and 6 and the internal tubular frame 1.

Such a support operates as follows.

At rest, the support is in the condition shown in FIGS. 1 and 2.

If, from this situation, a force is applied to the external frame 2, with respect to the internal frame 1, in direction Y in the direction of arrow F, pocket A is contracted by crushing whereas, on the contrary, pocket B expands and the overall volumes of the two chambers C and D remain substantially constant : the liquid 2 contained initially in pocket A is then driven towards pocket B through the narrow channel E.

This effect is reversed as soon as a force is exerted on the support in a direction opposite the preceding one.

The alternation of these forces is generally renewed at a certain frequency and, for a value F of this frequency which is predetermined and related to the dimensions of the narrow channel E, and in particular to the ratio between its cross section and its length, the liquid mass flowing through this channel is caused to resonate and the support then exerts an excellent damping effect on the transmission of the oscillations from one of the frames to the other.

The support illustrated in FIG. 3 differs from the preceding one in that the narrow channel E, again rectilinear and oriented axially, extends along the internal frame 1 instead of extending along the external frame 2 : it is here defined inwardly by a groove $1_1$ formed in the external face of the frame 1 and externally by a cylindrical socket 8 inserted jointingly between this frame 1 and the internal face of the central annulus $3_1$.

Here, the socket 4 of the preceding embodiment is omitted, the jacket $3_5$ which inwardly lines the external frame 2 is integrally molded with the central annulus $3_1$, and an external cylindrical ring 9 defines annulus $3_2$ outwardly and is force fitted in the corresponding end of said jacket $3_5$.

In the support illustrated in FIG. 4, the two pockets A and B are formed axially in two separate annuli $3_6$ and $3_7$ joining the two frames 1 and 2 together and they both open towards the center of the sleeve, into annular chambers C and D which are here separated axially from each other by a third annulus $3_8$ extending along the median axial plane of the sleeve and also connecting the two frames 1 and 2 together.

The metal rings and sockets are here distributed internally and externally as on the three annuli of FIG. 3, jacket $3_5$ which lines frame 2 inwardly being integrally molded with the central annulus $3_8$ and the narrow channel E following externally the internal frame 1.

Following which and whatever the embodiment adopted, a hydraulic damping support is obtained whose construction and operation follow sufficiently from the foregoing.

This support has numerous advantages with respect to those known heretofore and in particular the following:

—its two pockets A and B remain sealingly separated form each other during operation of the support and during the whole life thereof, except that they may communicated with each other through the narrow channel E which is formed in a central portion of the support, which portion remains free from strongly marked deformations and the risk of separation between separate parts, —radial deformation of the support is possible as far as total crushing of each pocket A or B, which crushing defines a progressive and efficient end of travel stop, —the transverse size of the support may be very small, its external diameter being able to be decreased to 35 mm or even less, —manufacture of said support is easy and economic.

As it goes without saying, and as it follows moreover already from what has gone before, the invention is in no wise limited to those of its modes of application and embodiments which have been more specially discussed; it embraces, on the contrary, all variants thereof.

I claim:

1. A hydraulic antivibratory support sleeve comprising two rigid tubular frames (1,2) one surrounding the other and joined together by an elastomer body (3) adhered thereto and shaped so as to form therewith at least two diametrically opposite sealed pockets (A,B), communicating together through a narrow channel (E), the assembly formed by said pockets and said narrow channel being filled with a damping liquid (L), the pockets being in the form of cavities formed axially in at least one solid annulus forming the elastomer body, which cavities have a relatively small radial thickness so as to be substantially closed by radial crushing, characterized in that the pockets (A,B) open respectively into two separate at least semi-annular chambers (C,D) formed in the elastomer body and in that these two chambers are joined together exclusively by the above narrow channel (E), said channel being oriented in a direction having at least an axial component.

2. Sleeve according to claim 1, characterized in that the two pockets (A,B) are formed axially in two opposite directions in the same central annulus ($3_1$) and in that each of the two annular or semi-annular chambers (C,D) into which these two pockets open respectively is defined axially by said central annulus ($3_1$) and by an end annulus ($3_2$, $3_3$).

3. Sleeve according to claim 1, characterized in that the two pockets (A,B) are formed axially in two opposite directions in two separate annuli ($3_6$, $3_7$) and in that the two annular or semi-annular chambers (C,D) into which the two pockets open respectively are separated axially from each other by a third central annulus $3_8$.

4. Sleeve according to claim 1, characterized in that the narrow channel (E) extends along the external tubular frame (2).

5. Sleeve according to claim 1, characterized in that the narrow channel extends along the internal tubular frame (1).

* * * * *